United States Patent Office 3,445,565
Patented May 20, 1969

3,445,565
SPRAYABLE COMPOSITION FOR THE APPLICATION TO THE FUR OF ANIMALS
Edmund G. Locher, Zurich, Switzerland (Chateau-de-la-Motte, Chateaurenard, Loiret, France); Eugen Wyler, 18 Allmendboden, Kusnacht, Zurich, Switzerland; and Hermann Nolting, 43 Kulmannstrasse, Zurich, Switzerland
No Drawing. Filed Jan. 24, 1966, Ser. No. 522,356
Claims priority, application Switzerland, Jan. 26, 1965, 1,085/65
Int. Cl. A61k *27/00;* A01n *9/00, 17/08*
U.S. Cl. 424—46                                       3 Claims

ABSTRACT OF THE DISCLOSURE

A sprayable composition for the application to the fur of animals consists essentially of a normally gaseous propellent at a pressure sufficient to liquify same, a minor amount of a normally liquid insect repellent or insecticide as an active agent, the active agent being dissolved in the propellent while the latter is in the liquid state, and a major amount of an inert solid carrier in powder form, dispersed in the solution of the active agent in the propellent. Each particle of the powdered carrier has a minute part of said solution absorbed therein or adsorbed thereon to help the active agent penetrate more deeply when sprayed from an aerosol can on an animal's fur.

---

This invention relates to body treatments, particularly to the treatment of animal bodies, and is mainly concerned with sprayable compositions and their use in such body treatment.

An object of the invention is the provision of sprayable compositions which may be used for combating insects or other parasites in the fur of domestic animals.

A more specific object is the provision of a composition which is capable of penetrating deeply even into dense fur when propelled from a conventional aerosol container under the pressure of conventional propellents.

It has been found that liquid active agents such as insecticides and insect repellents when applied from pressure cans by means of the usual fluorocarbon propellents in which they are soluble reach the site of their intended effect at very low velocity. The evaporation of the propellent leaves extremely fine droplets of the active agent whose kinetic energy is rapidly converted to heat by friction between their large combined surfaces and the ambient air. If it is attempted to increase the kinetic energy of the particles by higher initial propellent pressure, the rapidly moving liquid droplets are broken up by air friction until the afore-described condition is again reached. The velocity of the particles on impact is not significantly increased by higher propellent pressure.

When a conventional liquid insecticide or insect repellent composition is sprayed against the fur of a domestic animal, the active agent is mainly deposited on the surface, and does not penetrate the fur. It is readily accessible to the tongue of the animal and is lost when the animal rubs against walls or other objects.

It has further been found that liquid active agents are readily adsorbed or absorbed by suitable inert solid carriers dispersed in the propellent and discharged therewith from a pressure container, and that the solid particles penetrate quite deeply into the fur and carry the adsorbed liquid insecticide or insect repellent with them. The greater density of the solid carrier particles and their better resistance to the disintegrating effects of the expanding propellant are believed to account for the observed facts.

Example 1

15 g. talcum powder, 75 mg. allethrin and 100 mg. vetiver oil were placed in a pressure can equipped with a spray nozzle into which 140 g. of a mixture of equal weights of trichlorofluoromethane and dichlorodifluoromethane were introduced whereby the pressure in the can reached 175 p.s.i.g. and the propellants were kept liquid. The allethrin dissolved in the fluorocarbons and was partly adsorbed therefrom by the talcum in the can.

When the contents of the can were mixed by shaking and released through the opened nozzle, there was obtained a stream of talcum particles traveling at high velocity and having substantially the entire allethrin and vetiver oil adsorbed thereon. The stream deeply penetrated into the fur of a treated dog and carried much of the active agents to the very skin of the animal. Only a minor portion of the spray was deposited on or near the surface of the fur where it could be licked off or otherwise be removed. The insecticidal and insect repelling effect was excellent even with very small amounts of active agent. The amount of the active agents dispersed in the ambient air and available for inhalation by the animal and the person performing the treatment was insignificant.

The combined weight of the active substances was not substantially more than 1 percent of the talcum carrier. It was therefore easy to apply the active agents evenly and in small amounts over the entire skin of the animal.

Substantially the same results were obtained when talcum powder was replaced by starch. The pH value of rice starch is approximately 5.0, that of corn starch 5.4, and that of potato starch 6.1. These values are quite close to that of the skin.

Example 2

A pressure can equipped with a nozzle was charged with 12 g. finely powdered rice starch as an inert carrier, 0.4 g. pyrethrum extract and 0.5 g. piperonyl butoxide as insecticides, 50 gm. of a commercial perfume essence, 0.5 g. quassia oil which is an insect repellent, and 140 g. of the afore-mentioned propellant mixture.

When applied to dogs and cats in the manner described above, the composition had prolonged insecticidal and insect repellent effects. Because of the small quantities of active agents necessary with the use of a solid inert carrier, the advantages of the synergistic mixture of pyrethrum and piperonyl butoxide are fully utilized.

Example 3

14.0 grams of a powder mixture of talcum and starch (about 1:1) was mixed with 2.0 g. N,N-diethyl-m-toluamide and 1.0 g. DDT, and the dry mixture obtained was introduced into a pressure can together with 125.0 g. of the above fluorocarbon mixture and 15 g. deodorized kerosene. It was applied to the furs of animals as described above.

The inert carriers are primarily useful in enhancing the penetration of the fur by the liquid insecticides and insect repellents which cannot otherwise be driven into dense fur. They are further useful in adsorbing contaminants from the fur. When the powder is brushed from the fur it takes dirt and dust with it. Perfume applied together with an inert carrier by the method of the invention tends to be adsorbed by the fatty matter in the fur, and this invention provides a simple and effective method for applying masking perfumes to pets.

Example 4

A therapeutic sprayable composition was prepared from 12.0 g. talcum powder as carrier and 1.0 g. benzoic acid, 2.50 g. undecylenic acid and 0.50 g. thymol as active agents, and 140 g. fluorocarbon propellent.

The medicinal ingredients of the above composition readily penetrated to the skin through rather dense fur and were effective against fungus infections of the skin.

It is a particular advantage of the compositions of the invention that they are practically anhydrous and may therefore be employed in the treatment of animals which are sensitive to water at low ambient temperatures. Local over-application is readily avoided because the applied solid particles remain visible on and in the fur and it is possible to gage the quantity applied by inspection.

The solid powder inert in itself, but capable of adsorbing or absorbing the active agents, particularly liquid active agents, reduces or prevents the absorption of potentially toxic agents through the skin. Substantially greater amounts of DDT could be applied to the skin of animals in the compositions of the invention than in conventional aerosol compositions without excretion of halogenated organic compounds by the animals. Yet, substantially smaller amounts of active agents were required with the compositions of the invention than with conventional aerosols for producing the same insecticidal effects.

The velocity of the solid particles on impact is directly related to the propellant pressure in the container from which the compositions of the invention are released. The size of the particles on impact is not affected by their initial velocity as has been found with liquid aerosols and set forth above. The penetrating power of the spray compositions of the invention can, therefore, be controlled over a wide range by the choice of propellant pressure in the can.

The prolonged effectiveness of the sprayable compositions of the invention is due to the fact that the liquid active agents are gradually released from the carrier in which they are adsorbed or absorbed. The longer effectiveness is thus not achieved at the risk of skin irritation by high local concentrations of active agents.

The method of the invention is applicable not only to furs of living animals but to fur clothing and the like. Mothproofing of furs is but one application which readily suggests itself.

What is claimed is:
1. A sprayable composition for application to the fur of domestic animals, consisting essentially of a normally gaseous propellent from the group consisting of fluorocarbons and mixtures thereof at a pressure sufficient to liquify same, a minor amount of a normally liquid active agent from the group consisting of allethrin, vetiver oil, pyrethrum, piperonyl butoxide, N,N-diethyl-m-toluamide, DDT, benzoic acid, undecylenic acid, and thymol, and mixtures thereof, said active agent being dissolved in said propellant while the latter is in the liquid state, and a major amount of a carrier in powder form, dispersed in the solution of said active agent in said propellant, the particles of said powdered carrier being inert to the skin and fur of domestic animals, each of said particles having a minute part of said solution adsorbed thereon to help said active agent penetrate more deeply when sprayed from an aerosol can on said fur than said active agent can penetrate in the absence of said powdered carrier.

2. A composition as set forth in claim 1, wherein said carrier has a pH of approximately 5.0 to 6.1

3. A composition as set forth in claim 1, which is anhydrous.

References Cited
UNITED STATES PATENTS

| | | | |
|---|---|---|---|
| 2,709,111 | 11/1952 | Green | 167—39 |
| 2,927,880 | 3/1960 | Casida et al. | 167—24.1 |
| 3,130,121 | 4/1964 | Rapport | 167—24.1 |
| 3,088,874 | 5/1963 | Geary et al. | 167—39 |
| 2,980,582 | 4/1961 | Keats | 167—39 |
| 2,071,484 | 3/1937 | Wittwer | 167—13 |

FOREIGN PATENTS

| | | |
|---|---|---|
| 1,115,981 | 10/1961 | Germany. |

FRANK CACCIAPAGLIA, Jr., *Primary Examiner.*

U.S. Cl. X.R.

424—186, 282, 317, 320, 346, 354